May 20, 1969  G. K. PARTAIN  3,444,662
REDUCING EDGE MOMENTS IN A BONDED LAMINATED LOAD-CARRYING
GLASS AND ATTACHMENT ASSEMBLY
Filed Jan. 27, 1966
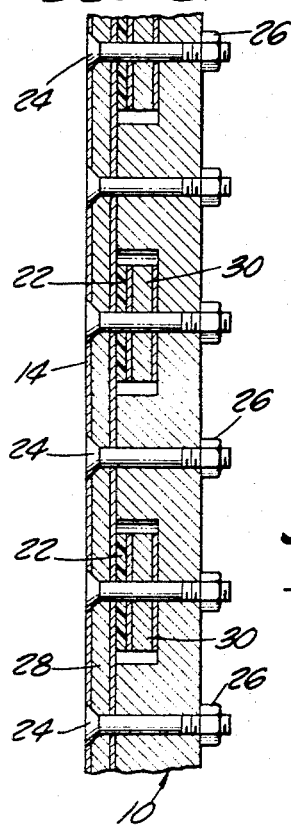
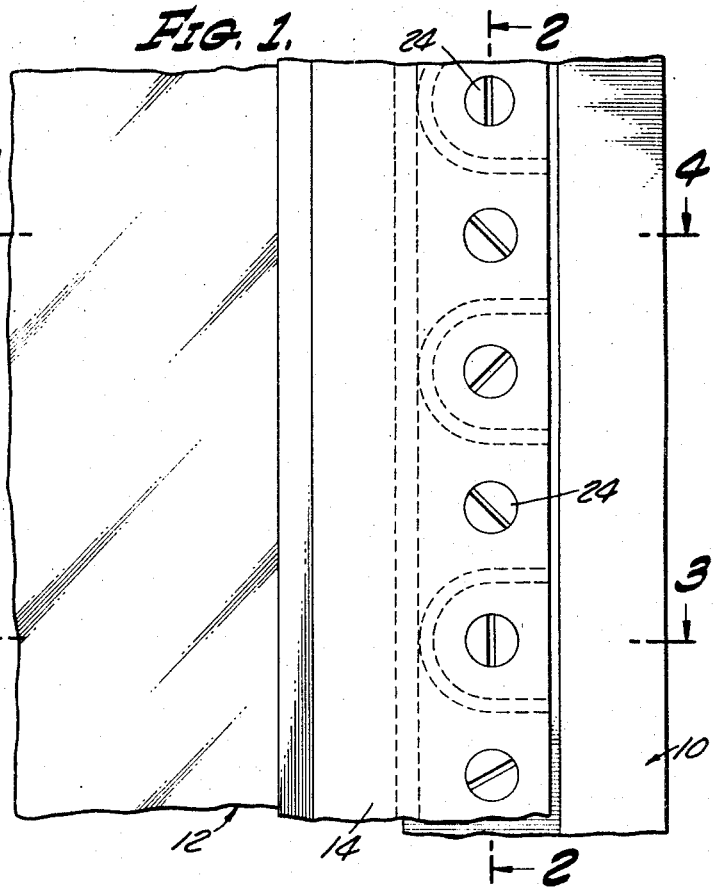
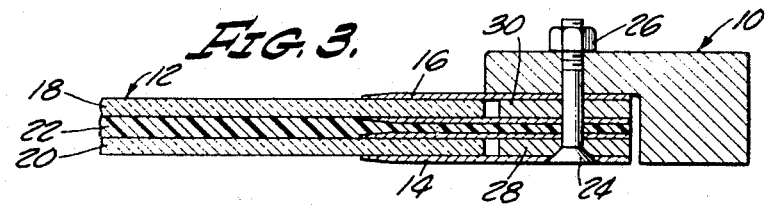
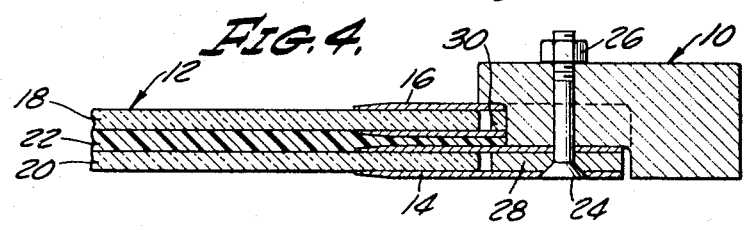
INVENTOR.
GERALD K. PARTAIN
BY Lyon & Lyon
ATTORNEYS

3,444,662
Patented May 20, 1969

3,444,662
REDUCING EDGE MOMENTS IN A BONDED
LAMINATED LOAD-CARRYING GLASS AND
ATTACHMENT ASSEMBLY
Gerald K. Partain, Hawthorne, Calif., assignor to
Whittaker Corporation, Los Angeles, Calif., a corporation of California
Filed Jan. 27, 1966, Ser. No. 523,385
Int. Cl. E06b 3/02; E04c 2/54; B64c 1/14
U.S. Cl. 52—623           6 Claims

ABSTRACT OF THE DISCLOSURE

A glass assembly having glass layers separated by a plastic interlayer, disposed around the edge of said assembly a pair of adherends for gripping and retaining each individual glass layer, the improvement wherein one of said pair of adherends grips it glass layer only at spaced intervals.

---

The invention relates to a means for reducing edge moments in a bonded laminated load-carrying glass and attachment assembly mounted with a single shear attachment. The invention more particularly pertains to a novel glass assembly.

In the windshield and canopy design for modern aircraft, because of aerodynamic smoothness and space restrictions, the windshield and canopy assembly is bolted to the sill frame. In the conventional design, however, because of the curvature of the windshield and canopy, the transparent assemblies and attachments are subjected to hoop tensile loading as a result of interior pressurization. In addition, conventional attachment of the windshield and canopy assembly to the sill frame to maintain aerodynamic smoothness is by a single shear bolt. The combination of the hoop tension and the single shear bolted attachment introduces an edge bending moment into the transparency and attachment assembly which has been found to be very detrimental to the structural efficiency of the system.

In the past, plastic transparent materials have been generally used where hoop tensile loadings are encountered. These materials exhibit some degree of ductility, thus allowing for localized yielding around stress concentration points and subsequent stress redistribution. The ductile materials therefore are less subject to catastrophic failure. However, the performance characteristics of many of the newer aircraft impose operating load and temperature extremes on the windshield and canopy which preclude the use of the commonly available transparent plastics. This is due to the inability of the plastics to withstand the aerodynamic heating which occurs during normal operations of such aircraft.

An alternate method which has been used to attach the windshield and canopy assembly to the sill frame utilizes an outer tension tie on the exterior of the assembly and frame, thus providing double shear load transfer and an axial loading condition which eliminates edge moments. The disadvantage of this design is that the presence of the outer tension tie distrupts aerodynamic smoothness. The aerodynamic requirements of certain modern aircraft dictate surfaces and joints which are as smooth and flush as possible, as well as curved surfaces which result in loading parallel to the curved transparent surface.

Accordingly, there has been a long felt requirement for the use of a glass material with bonded load-carrying attachments. However, even the strongest glasses exhibit no ductility. As such, when a stress greater than the failing stress of the glass builds up around a point of stress concentration there is no localized yielding and stress redistribution. Under these conditions catastrophic failure of the glass results. When undesirable edge moments occur, such as generated by the conventional attachments, the glass in the areas of the attachment is especially prone to these stress concentrations which cause failure.

Accordingly, it is a principal object of the present invention to provide a means for reducing the edge moment and to increase the load-carrying capability of windshield and canopy assemblies for use in aircraft and similar applications.

It is also an object of the present invention to provide for a windshield and canopy assembly attachment which does not involve the use of an outer tension tie or other means disruptive of aerodynamic smoothness.

A further object of the present invention is to provide an edge attachment assembly which permits the utilization of glass as a transparent material without the risk of stress greater than the failing stress of glass building up around points of stress concentration.

These and other objects of the present invention will become apparent from the more detailed description which follows.

Summary of the invention

Briefly, the present invention comprises glass layers separated by a plastic interlayer, a pair of adherends for gripping and retaining each individual glass layer disposed around the edge of said glass layers, the improvement wherein the adherends at spaced intervals around the edge of the glass alternately grip the adjacent layers of said glass and grip only one of said layers of glass. By the present invention it is possible to provide for the structural integrity of a glass attachment system under the restrictions imposed by the aerodynamic and performance characteristics of modern supersonic aircraft, such as the F-111.

The present invention can be more fully understood by reference to the accompanying drawings in which:

FIGURE 1 is a plan view of a portion of the glass and glass attachment assembly of the present invention.

FIGURE 2 is a sectional view taken along the line 2—2 of FIGURE 1.

FIGURE 3 is a sectional view taken along the line 3—3 of FIGURE 1.

FIGURE 4 is a sectional view taken along the line 4—4 of FIGURE 1.

As is shown in the drawing, the frame or sill is designated generally as 10 and the glass as 12. Connecting the glass 12 to the frame 10 are the pairs of adherends 14 and 16. In the drawings, the glass 12 comprises an inner glass layer 18 and an outer glass layer 20 separated by a plastic interlayer 22. The adherend pair 14 grips the glass layer 20 and the adherend pair 16 grips the glass layer 18. The pairs of adherends are held to frame 10 by bolt 24, secured by nut 26. Between adherend pair 14 there is positioned spacer 28 and between adherend pair 16 is positioned spacer 30.

The principal novel feature of this invention consists in machining out the adherend 14 and spacer 28 adjacent to the inner ply of glass 20 and interlayer 22 around alternate attachment bolt holes. This assembly is then fitted to a similarly machined frame 10 so that the inner and outer glass attachment assemblies alternately pick up the maximum loads at alternate bolt locations. This then provides less eccentric loading and a resultant increase in load-carrying capabilities.

It will therefore be immediately apparent to those skilled in the art that by the novel design of the present invention, each ply of glass is subjected to half the load instead of making the inner glass ply 18 carry all of the load until it fails. The redistribution of the load by the design of the present invention has been found to make possible the use of glass in frames in supersonic aircraft without the risk of catastrophic failure. Moreover, this present invention eliminates the problems associated with the use of transparent plastics under the conditions involved in the operation of modern supersonic aircraft.

While the invention has been described with reference to certain preferred structures useful for reducing edge moments in bonded laminated load-carrying glass, it is to be understood that these specific examples are illustrative rather than limiting. Not only has applicant provided a new kind of glass assembly not heretofore available in the aircraft industry, but there has also been provided novel and useful window assemblies containing such glass.

Accordingly, having described the invention, it is intended that it be limited only by the lawful scope of the appended claims.

I claim:

1. A glass assembly comprising glass layers separated by a plastic interlayer, disposed around the edge of said assembly a pair of adherends for gripping and retaining each individual glass layer, the improvement wherein one of said pair of adherends grips its glass layer only at spaced intervals.

2. A glass assembly comprising at least two glass layers separated by a plastic interlayer, disposed around the edge of said assembly a pair of adherends for gripping and retaining each individual glass layer, the improvement wherein one of said pair of adherends grips its glass layer only at spaced intervals.

3. A glass assembly comprising two glass layers separated by a plastic interlayer, disposed around the edge of said assembly a pair of adherends for gripping and retaining each of the two glass layers, the improvement wherein one of said pair of adherends grips its glass layer only at spaced intervals.

4. A window assembly comprising a glass assembly having glass layers separated by a plastic interlayer, disposed around the edge of said assembly a pair of adherends for gripping and retaining each individual glass layer, the improvement wherein one of said pair of adherends grips its glass layer only at spaced intervals; and a frame having recesses therein of a thickness corresponding to the edge of said glass assembly whereby the glass assembly is received in said frame and is flush therewith.

5. A window assembly comprising a glass assembly having at least two glass layers separated by a plastic interlayer, disposed around the edge of said assembly a plurality of adherends for gripping and retaining the individual glass layers, the improvement wherein one of said pair of adherends grips its glass layer only at spaced intervals; and a frame having recesses therein of a thickness corresponding to the edge of said glass assembly whereby the glass assembly is received in said frame and is flush therewith.

6. A window assembly comprising a glass assembly having two glass layers separated by a plastic interlayer, disposed around the edge of said assembly a pair of adherends for gripping and retaining each of the two glass layers, the improvement wherein one of said pair of adherends grips its glass layer only at spaced intervals; and a frame having recesses therein of a thickness corresponding to the edge of said glass assembly whereby the glass assembly is received in said frame and is flush therewith.

References Cited

UNITED STATES PATENTS

| | | | |
|---|---|---|---|
| 2,379,194 | 6/1945 | Shonts et al. | 52—208 |
| 2,409,808 | 10/1946 | Sowle | 52—208 X |
| 2,683,678 | 7/1954 | Adams | 52—624 X |
| 2,730,777 | 1/1956 | Koriagin | 52—573 X |
| 2,856,650 | 10/1958 | Hildebrand | 52—208 |
| 2,808,355 | 10/1957 | Christie et al. | 52—208 |
| 2,939,186 | 7/1960 | Norwood et al. | 52—208 X |
| 3,009,845 | 11/1961 | Wiser | 52—622 X |

DENNIS L. TAYLOR, *Primary Examiner.*

U.S. Cl. X.R.

52—208